Aug. 17, 1954 — A. L. SWEIGART — 2,686,560
GAS INJECTOR
Filed Nov. 27, 1950 — 2 Sheets-Sheet 1
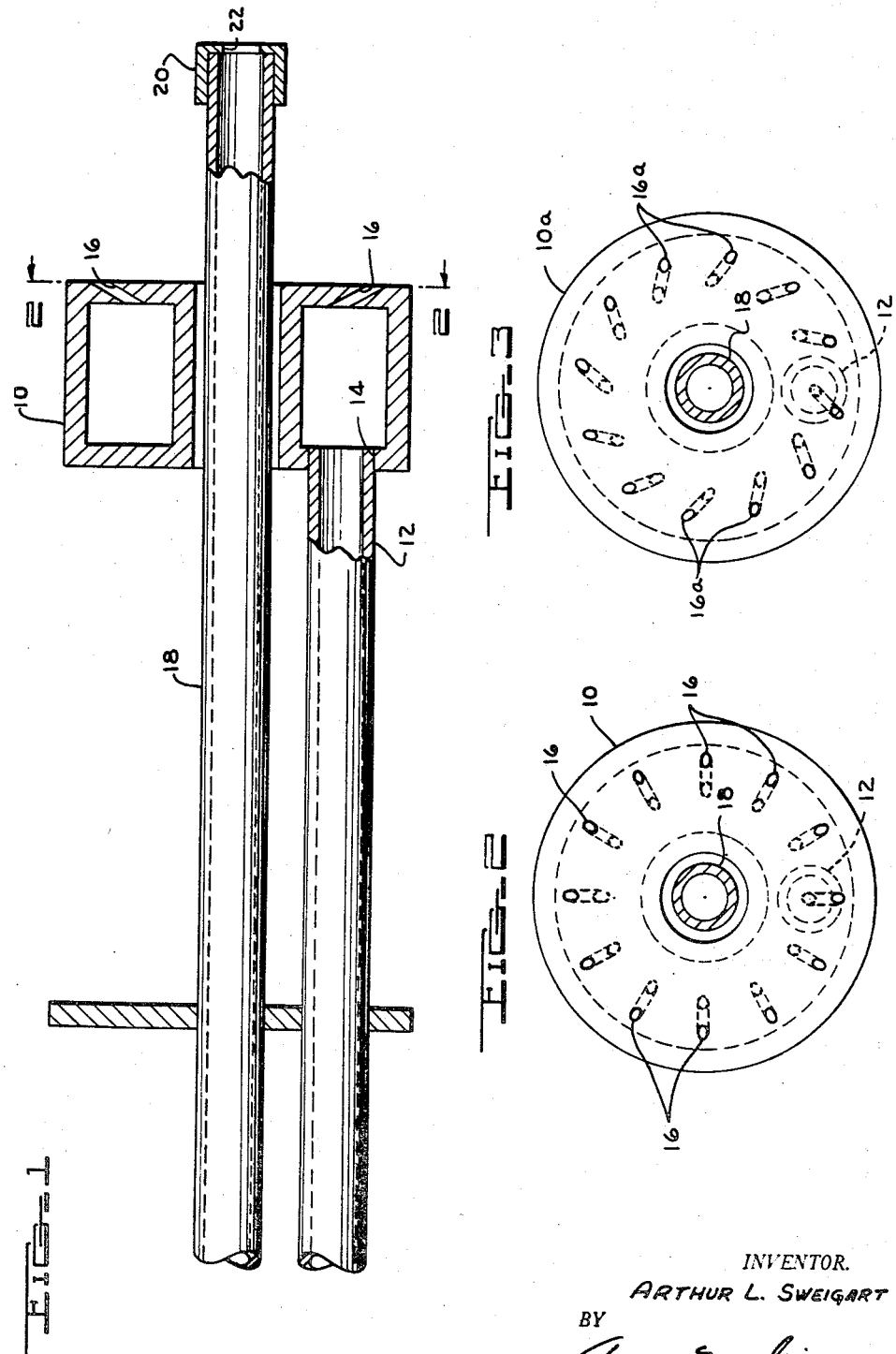
INVENTOR.
ARTHUR L. SWEIGART
BY
ATTORNEY

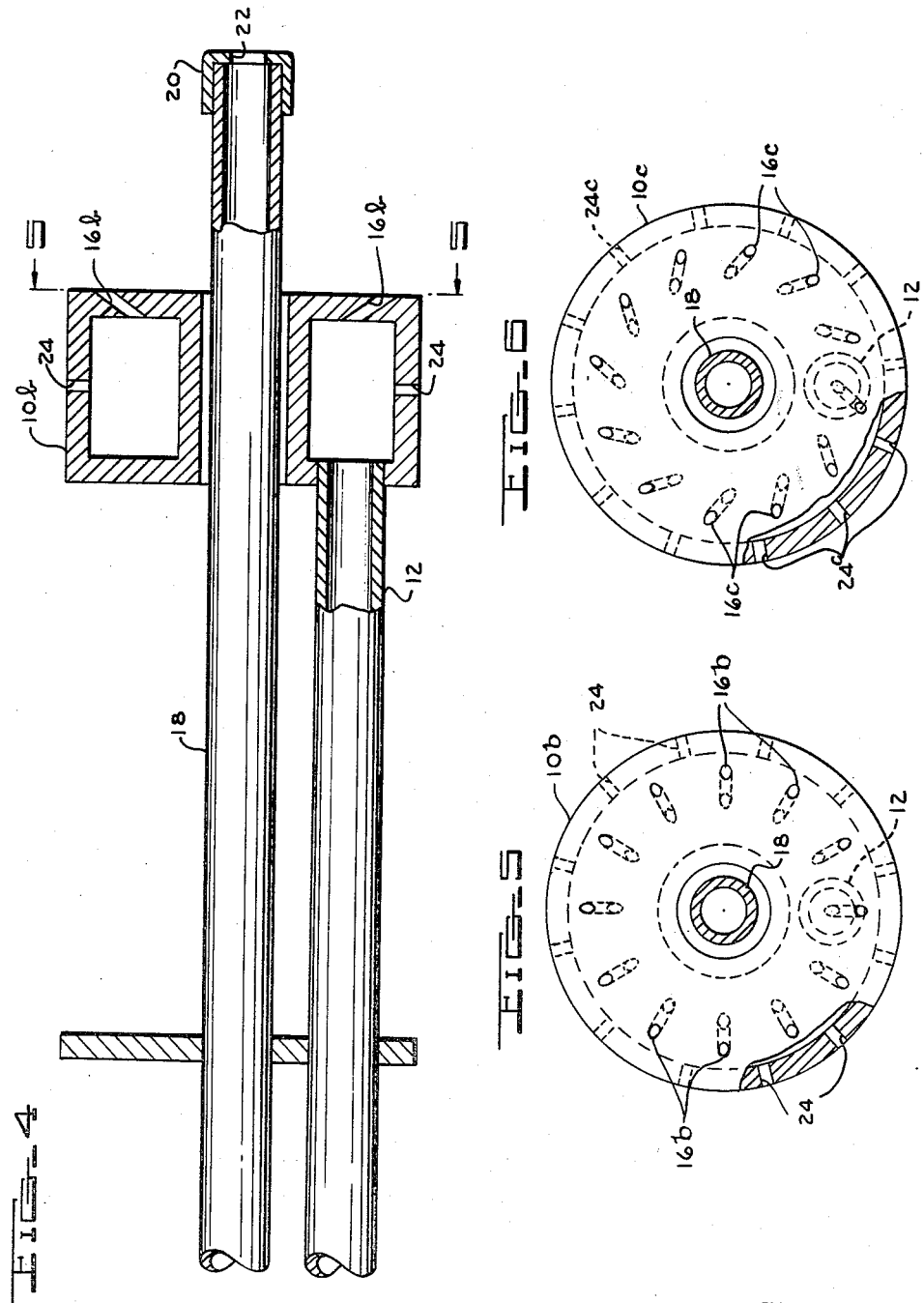

Patented Aug. 17, 1954

2,686,560

UNITED STATES PATENT OFFICE 2,686,560

GAS INJECTOR

Arthur L. Sweigart, Borger, Tex., assignor to United Carbon Company, Inc. (Maryland), Charleston, W. Va.

Application November 27, 1950, Serial No. 197,741

2 Claims. (Cl. 158—11)

The present invention relates to hydrocarbon injectors principally adapted for use in furnace processes for the production of carbon black, and it is especially well suited for use with apparatus for producing carbon black of the type shown in co-pending application, Serial No. 197,743, filed November 27, 1950.

It is an object of the present invention to provide a hydrocarbon injector adapted for use in converters or furnaces for the production of carbon black, the injector being constructed and arranged to permit a hydrocarbon gas or vapor to be directed outwardly into an air stream and toward the walls of the furnace as a cone generally surrounding a centrally located stream of hydrocarbon gases or vapors.

It is a further object of the present invention to provide a hydrocarbon injector as described in the preceding object and wherein the hydrocarbon which is admixed with air and burned to provide heat for the process is directed into the furnace at spaced points in predetermined locations.

Other objects of this invention will appear in the following description and appended claims, reference being had to the accompanying drawings forming a part of this specification wherein like reference characters designate corresponding parts in the several views.

In the drawings:

Fig. 1 is a longitudinal view partly in section of the hydrocarbon injector of the present invention;

Fig. 2 is a sectional view taken on the line 2—2 of Fig. 1 in the direction of the arrows;

Fig. 3 shows a modified form of the annular member of the hydrocarbon injector wherein the discharge apertures are inclined radially.

Fig. 4 is a longitudinal view partly in section of another modification of the hydrocarbon injector;

Fig. 5 is a sectional view taken on the line 5—5 of Fig. 4 in the direction of the arrows; and Fig. 6 is a modified form of the annular member of the hydrocarbon injector shown in Fig. 5 wherein the discharge apertures on its front face are inclined radially.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings and particularly to Figs. 1 and 2, an embodiment of the present hydrocarbon injector is shown having a hollow annular member 10 into which a hydrocarbon in the form of a gas or vapor can be introduced by means of a supply conduit 12 which is secured by any suitable means in the aperture 14. The forward portion of the annular member 10 has a plurality of apertures 16 circumferentially spaced therein. In the modification of the invention shown in Fig. 2, these apertures extend radially outwardly and are inclined to the axis of the annular member 10 so that the hydrocarbon gas or vapor can be discharged therefrom as a hollow generally conical sheet or stream for a purpose which will be more fully described hereinafter. The apertures 16 may be drilled in any desired portion of the forward face of the annular member 10 and may be inclined or straight, as desired.

Extending axially through the hollow annular member 10 is an adjustable conduit 18 movable longitudinally into adjusted position relative to the annular member 10 and adapted for introducing into a furnace (not shown), a hydrocarbon gas or vapor as a stream surrounded generally by the hollow conical sheet or stream of hydrocarbon discharged through said ports 16 or 16a. A removable cap 20 provided with an orifice 22 of a desired size is disposed over the end of the conduit 18. It is not necessary that a single orifice 22 be used, but if desired, a plurality of smaller orifices of suitable size may be employed. A hydrocarbon gas or vapor is supplied to the conduit 18 and discharged through the orifice 22. The hydrocarbon gas may be natural gas or a manufactured gas. The hydrocarbon vapors may be derived from a hydrocarbon oil which is vaporized in a preheating chamber prior to being fed to the conduit 18.

Fig. 3 shows a modified form of the annular member 10a wherein the plurality of apertures 16a are inclined to the axis of the annular member 10a and are also radially inclined.

Figs. 4 and 5 show another modification of the invention, which is similar to that shown in Figs. 1 and 2, and like reference numbers are employed to designate like parts. This modification differs from that of Figs. 1 and 2 in that it has a plurality of circumferentially spaced apertures 24 around the outer periphery of the hollow annular member 10b. The apertures 24 cooperate with apertures 16b to provide an annular sheet of hydrocarbon gas or vapor which will surround the hydrocarbon materials introduced into the furnace (not shown).

Fig. 6 shows still another modification of the annular member 10c wherein apertures 24c are provided and the plurality of apertures 16c are inclined to the axis of the annular member 10c and are also radially inclined.

In operation, the hydrocarbon injector of the present invention is intended for use particularly with a converter or furnace for producing carbon black in which an annular stream of air is introduced into the furnace adjacent the side walls thereof, and between the side walls and the hydrocarbon injector. The hydrocarbon, which is to provide the principal source of the carbon black is preferably in the form of an oil vapor or natural gas. This material is introduced through the conduit 18 which is disposed axially of the annular member 10. The conduit 18 is movable longitudinally relative to the hollow annular member 10 to locate the desired point for the introduction of the hydrocarbons to be decomposed. The hydrocarbon gas or vapor, which is to provide the chief source of heat for the decomposition of the carbon-forming materials, is supplied through the conduit 12 and flows into the hollow annular member 10 to be discharged into the furnace in a hollow generally conical stream or sheet. The gas or vapor discharged from the annular member 10 is mixed with air for combustion which is introduced as an annular stream generally surrounding the hydrocarbon injector. Since the total amount of air introduced into the converter is insufficient to effect combustion of all of the hydrocarbons supplied to the furnace, the unburned portions thereof are decomposed by the heat of the burning hydrocarbon and air to form carbon black.

It has been found that a hydrocarbon injector of the type shown and described herein, is highly efficient in operation and has been found to promote the desired operating characteristics of carbon black producing furnaces to produce desired types of carbon black. The properties of the produced carbon black may be influenced and controlled by the adjustment of the tube 18 longitudinally relative to the hollow annular member 10, and this locates the point of discharge of the hydrocarbons from the tube 18 into the hollow generally conical mass of admixed gas and air surrounding the discharge end of the tube 18. By varying this point, the same injector may be used to produce carbon blacks of differing properties. This hydrocarbon injector is particularly well suited for so introducing the hydrocarbons as to maintain a stable flame in the furnace with which it is used and thus to secure improvements in the yield and quality of the produced carbon black.

The modification of the invention shown in Figs. 1 and 2 is particularly well suited for use in carbon black producing furnaces. However, in the event it is desired to provide a more rapid and thorough mixing of the stream of air and heating hydrocarbon gas being introduced into the furnace, this may be accomplished by the use of the modified form of the invention shown in Fig. 3. With this construction, the direction imparted to the jets of gas or vapor when introduced into the furnace through the ports 16a result in a more rapid and thorough mixing of the gas and air.

As explained above, the modifications of Figs. 4 and 5 and of Fig. 6 differ from those of Figs. 1 to 3 in that the former have additional hydrocarbon discharge apertures 24 and 24c. An annular member having these apertures formed therein is employed when it is desired to provide an annular admixture of air and hydrocarbons of relatively greater thickness surrounding the axial stream of hydrocarbons introduced into the furnace (not shown) from the conduit 18.

The selection of the particular form of injector and the particular adjustment of the conduit 18 is governed by the time and temperature conditions which are to be maintained in the operations.

Having thus described my invention, I claim:

1. A fluid hydrocarbon injector for use in producing carbon black comprising a conduit having an open end having a large opening directed forwardly only for discharging a stream of fluid hydrocarbons therefrom in a concentrated form, a hollow annular member coaxially disposed around said conduit and spaced rearwardly of the discharge end thereof, a conduit for supplying a hydrocarbon gas to the interior of said annular member, said annular member having a plurality of spaced apertures in its front side for discharging said hydrocarbon gas therefrom, said plurality of apertures being radially disposed, directed outwardly, and inclined to the axis of said hollow annular member for discharging the hydrocarbon gas in a sleeve surrounding said stream of fluid hydrocarbons, said member being spaced materially rearwardly of said open end of said tube, said position and aperture angularity preventing direct intermingling of said fluid and gas streams, whereby the hydrocarbon gas can be admixed with air surrounding the same to support combustion for use in converting the concentrated stream of fluid hydrocarbons into carbon black.

2. A fluid hydrocarbon injector as defined in claim 1 wherein said annular member has a plurality of uniformly spaced apertures radially directed around its outer periphery.

References Cited in the file of this patent

UNITED STATES PATENTS

| Number | Name | Date |
| --- | --- | --- |
| 1,671,494 | Stewart | May 29, 1928 |
| 1,687,390 | Ritter | Oct. 9, 1928 |
| 1,773,002 | Hunt | Aug. 12, 1930 |
| 1,888,804 | Nash et al. | Nov. 22, 1932 |
| 1,938,335 | Hubbard et al. | Dec. 5, 1933 |
| 1,969,157 | Shoenberger | Aug. 7, 1934 |
| 1,991,894 | Forney | Feb. 19, 1935 |
| 2,259,818 | Henriksen | Oct. 21, 1941 |
| 2,310,454 | Mulholland | Feb. 9, 1943 |
| 2,462,704 | Zink | Feb. 22, 1949 |
| 2,529,873 | Heller | Nov. 14, 1950 |
| 2,553,199 | Loving | May 15, 1951 |
| 2,564,700 | Krejci | Aug. 21, 1951 |